(12) United States Patent
Li et al.

(10) Patent No.: US 9,311,869 B2
(45) Date of Patent: Apr. 12, 2016

(54) DISPLAY SYSTEM

(71) Applicant: BOE Technology Group Co., Ltd., Beijing (CN)

(72) Inventors: Wenbo Li, Beijing (CN); Yefei Dong, Beijing (CN); Yanbing Wu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 30 days.

(21) Appl. No.: 14/546,187

(22) Filed: Nov. 18, 2014

(65) Prior Publication Data

US 2016/0012786 A1 Jan. 14, 2016

(30) Foreign Application Priority Data

Jul. 11, 2014 (CN) .......................... 2014 1 0331674

(51) Int. Cl.
*G09G 3/36* (2006.01)
*G06F 3/14* (2006.01)

(52) U.S. Cl.
CPC ............ *G09G 3/3611* (2013.01); *G06F 3/1446* (2013.01); *G09G 2300/026* (2013.01); *G09G 2300/04* (2013.01)

(58) Field of Classification Search
CPC ............ G09G 3/3611; G09G 2300/04; G09G 2300/026; G06F 3/1446; H01L 25/10; H01L 27/3293
See application file for complete search history.

(56) References Cited

U.S. PATENT DOCUMENTS

| | | | | |
|---|---|---|---|---|
| 8,867,780 B2 * | 10/2014 | Hodge | ................... | G06F 21/84 382/100 |
| 2010/0321275 A1 * | 12/2010 | Hinckley | .............. | G06F 1/1618 345/1.3 |
| 2015/0286457 A1 * | 10/2015 | Kim | ...................... | G06F 3/1446 345/581 |

\* cited by examiner

*Primary Examiner* — Liliana Cerullo
(74) *Attorney, Agent, or Firm* — Westman, Champlin & Koehler, P.A.

(57) ABSTRACT

The present invention discloses a display system, comprising at least one jointed screen which is composed of a plurality of liquid crystal display panels jointed with each other, in which, each liquid crystal display panel is provided with a first polarizer only at a light entering side thereof, so that a visible angle at which contents displayed by the liquid crystal display panel can be seen from a light exiting side thereof is an obtuse angle; two adjacent jointed liquid crystal display panels are jointed with each other at their adjacent sides, and a joint angle formed at the light exiting side is greater than a right angle, such that the light exiting side of each display panel is located in a region covered by an angle range of the visible angle of at least one display panels other than said display panel.

15 Claims, 4 Drawing Sheets

DISPLAY SYSTEM

CROSS-REFERENCE TO RELATED APPLICATION

This application claims the benefit of Chinese Patent Application No.201410331674.X filed on Jul. 11, 2014 in the State Intellectual Property Office of China, the whole disclosure of which is incorporated herein by reference.

BACKGROUND OF THE INVENTION

1. Field of the Invention

The present disclosure relates to the technical field of display, and more particular, to a display system.

2. Description of the Related Art

It is well known that a liquid crystal display panel becomes more and more popular in virtue of its light weight, thin thickness, low power consumption and multi-function. In the existing liquid crystal display panel, a lower polarizer is usually provided at a light entering side of the liquid crystal display panel, and an upper polarizer is usually provided at a light exiting side of the liquid crystal display panel. Only a polarized light having a polarization direction which is consistent with a direction of a light transmitting axis of the lower polarizer can pass through the lower polarizer, and after being modulated by liquid crystal molecules, a polarized light having a polarization direction which is consistent with a direction of a light transmitting axis of the upper polarizer can be transmitted out of the liquid crystal display panel to form images.

In a case where the upper polarizer of the liquid crystal display panel is absent, only a blank screen without showing any information can generally be seen. In this case, dedicated glasses integrated with an upper polarizer can be used to see such liquid crystal display panel. Thus, contents shown on the screen can be seen, thereby achieving anti-peeking display function. In the practical applications, however, it is found that display information can still be seen if a viewer looks at such liquid crystal display panel with his or her naked eyes from the light exiting side of the display screen at a certain inclination angle.

Therefore, it is one of technical problems needed to be solved by one skilled in the art that how to make use of the above-mentioned display defect to perform an optical design, so as to realize a special display function of the liquid crystal display panel which can be seen by naked eyes without the upper polarizer.

SUMMARY OF THE INVENTION

Concerning the above, an embodiment of the present invention provides a display system which is capable of utilizing a liquid crystal display panel without an upper polarizer to realize a special display function.

An embodiment of the present invention provides a display system, comprising at least one jointed screen which is composed of a plurality of liquid crystal display panels jointed with each other, in which:

each liquid crystal display panel is provided with a first polarizer only at a light entering side thereof, so that a visible angle at which contents displayed by the liquid crystal display panel can be seen from a light exiting side of the liquid crystal display panel is an obtuse angle;

two adjacent jointed liquid crystal display panels are jointed with each other at their adjacent sides, and a joint angle formed at the light exiting side is greater than a right angle, such that the light exiting side of each liquid crystal display panel is located in a region covered by an angle range of the visible angle of at least one liquid crystal display panels other than said liquid crystal display panel.

DETAILED DESCRIPTION OF EMBODIMENTS

Figure 1:
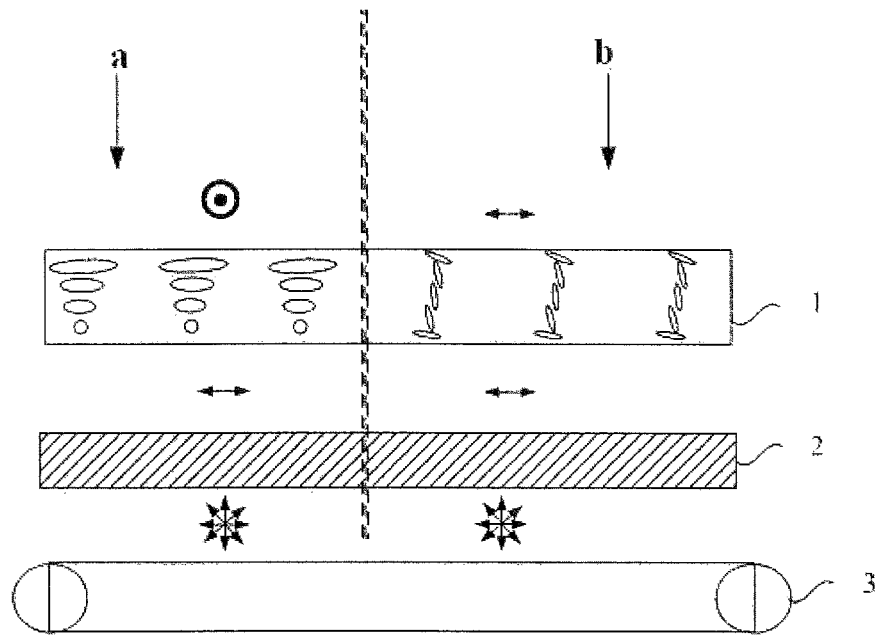
FIG. 1 is a schematic view of a liquid crystal display panel that can provide guard against peeking in the prior art.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Based on the defect that in a case where a liquid crystal display panel having no polarizers at a light exiting side thereof is designed as an anti-peeking display device, display information on the liquid crystal display panel can still be seen if a viewer looks at the liquid crystal display panel with his/her naked eyes from the light exiting side of the display panel at a certain inclination angle, the present invention proposes a display system for special display applications.

Specifically, the principle that the liquid crystal display panel having no polarizers at the light exiting side thereof is designed as the anti-peeking display device is described as follows. As shown in FIG. 1, region a and region b are in bright and dark states respectively. The liquid crystal display panel 1 only has a first polarizer 2. A light from a backlight source 3 is polarized through the first polarizer 2 to form a linear polarized light which is then transmitted through the liquid crystal display panel 1 and is transmitted out of the liquid crystal display panel 1. Since such light is not filtered by a second polarizer, information carried in the light cannot be seen by naked eyes and only a blank screen can be seen. In such case, dedicated glasses integrated with the second polarizer may be used for seeing the liquid crystal display panel 1. Thus, contents displayed by the screen can be seen, thereby providing guard against peeking.

Figure 2:
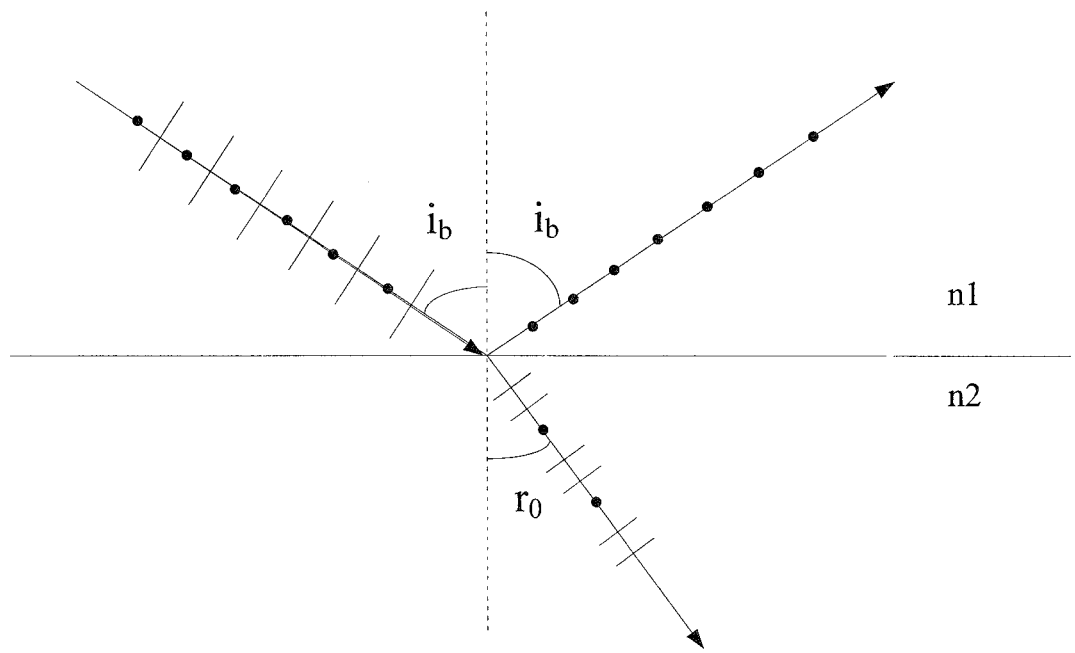
FIG. 2 is a schematic view of light refraction and light reflection in the prior art.

According to a mechanism for forming a polarization optical path, however, as shown in FIG. 2, when a light is reflected and refracted at an interface between two isotropic mediums, both the reflected light and the refracted light are partially-polarized light. In FIG. 2, $i_b$ indicates an incidence angle and a reflection angle, $r_0$ indicates a refraction angle, and $n_1$ and $n_2$ indicate refractive indices of the two isotropic mediums respectively. In the reflected light, the vertical polarization component P⊥ is greater than the parallel polarization component P//, while in the refracted light the parallel polarization component P// is greater than the vertical polarization component P⊥. The polarization intensity of the refracted light is generally increased as the incidence angle is increased. Thus, the further from the center of the display panel the screen is seen, the greater the polarization intensity of the refracted light transmitted out of the display screen is (degree of polarization P=(P//−P⊥)/P//+P⊥)). In a case where a viewer looks at the display panel from the light exiting side of the display screen at a certain inclination angle, since the incidence direction of the light is far from the center of the display panel (i.e., the incidence angle is large) such that the polarization intensity of the refracted light exiting out of the display panel becomes great and the display panel has a property of partial polarization. Thus, even if the upper polarizer is not provided, images on the display screen can be seen, causing defects in anti-peeking function of the anti-peeking display device.

The present invention makes use of such defects and proposes a special display function of a liquid crystal display panel. Next, the embodiments of the display system according to the present invention will be described in details in combination with the accompanying drawings. In the drawings, shapes of patterns in respective layers and shapes and sizes of respective regions are not intended to limit actual scales of the whole display system and are intended for illustration only.

Figure 3:
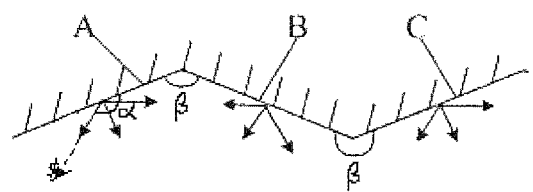
FIG. 3 is a schematic view of an example of a display system according to an embodiment of the present invention, in which only three liquid crystal display panels jointed together are shown for purpose of simplification.

For example, with reference to FIG. 3, the embodiments of the present invention propose a display system comprising at least one jointed screen which is composed of a plurality of liquid crystal display panels A, B, C . . . jointed with each other, in which:

each liquid crystal display panel is provided with a first polarizer only at a light entering side thereof, so that a visible angle α at which contents displayed by the liquid crystal display panel can be seen from a light exiting side of the liquid crystal display panel is an obtuse angle;

two adjacent jointed liquid crystal display panels are jointed with each other at their adjacent sides, and a joint angle β formed at the light exiting side is greater than a right angle, such that the light exiting side of each liquid crystal display panel is located in a region covered by an angle range of the visible angle of at least one liquid crystal display panels other than said liquid crystal display panel.

In the display system according to the present invention, the defect that display information on the liquid crystal display panel can be seen if a viewer looks at the anti-peeking liquid crystal display panel from the light exiting side of the liquid crystal display panel at a certain inclination angle is utilized, so that it is possible for a viewer located at any one of the liquid crystal display panels in the display system to see contents displayed by at least one liquid crystal display panels other than the one of the liquid crystal display panels, so as to meet display requirements for special applications.

It should be noted that in the present invention the term "a visible angle α at which contents displayed by the liquid crystal display panel can be seen from a light exiting side of the liquid crystal display panel" used for the display system according to respective examples or embodiments of the present invention is different from a visible angle of the liquid crystal display panel in the prior art. In the embodiments of the present invention, the term "a visible angle α at which contents displayed by the liquid crystal display panel can be seen from a light exiting side of the liquid crystal display panel" indicates an inclination angle at which images can be seen from the light exiting side of the display panel in a case where no polarizer is provided at the light exiting side of the display panel, that is, an angle between a line of sight of a viewer (indicated by the dashed line in FIG. 3) and a plane of the display panel, the display contents of which can be seen, in the direction of the viewer looking forwards. As explained above, in a case where no polarizer is provided at the light exiting side, the visible angle α is an obtuse angle, and the displayed images can also be seen in a case where no polarizer is provided at the light exiting side only if the visible angle is equal to or greater than a certain critical angle.

In the display system according to the embodiments of the present invention, since no upper polarizer is provided at the light exiting side of each liquid crystal display panel, information displayed on the screen cannot be seen at most of visible angles. The information displayed on the screen can be seen only if the visible angle is a significantly inclined angle (e.g., seen from a plane approaching the liquid crystal display panel at the light exiting side). Generally, the angle range of the visible angle at which contents displayed by the liquid crystal display panel can be seen increases as the size of the liquid crystal display panel is increased. For example, if the angle range of the visible angle at which contents displayed by the liquid crystal display panel can be seen is in a range of 150 degrees to 180 degrees for the liquid crystal display panel having a dimension of 55 inches, the angle range of the visible angle at which contents displayed by the liquid crystal display panel can be seen may be in a range of up to 150 degrees to 180 degrees for the liquid crystal display panel having a dimension of 70 inches. In other words, the larger the size of the liquid crystal display panel is, the more easily the contents displayed can be seen. Thus, when the joint angle between two adjacent jointed liquid crystal display panels at the light exiting side is arranged, a suitable joint angle can be selected according to the specific sizes of the jointed liquid crystal display panels, so that contents displayed on one liquid crystal display panel can be seen from the location where a light exiting side of another adjacent liquid crystal display panel lies.

In specific embodiments, since the size of the liquid crystal display panel will not be infinitely large, the angle range of the visible angle at which contents displayed by the liquid crystal display panel can be seen is generally in a range of 120 degrees to 180 degrees in the display system according to the embodiments of the present invention. Thus, the joint angles between the respective liquid crystal display panels jointed should be controlled to be greater than 150 degrees or slightly less than 150 degrees, so that contents displayed on one liquid crystal display panel can be seen from the location where a light exiting side of another adjacent liquid crystal display panel lies.

Further, in order to ensure that images can be clearly seen, it is preferable that the angle range of the visible angle at which contents displayed by the liquid crystal display panel can be seen is in a range of 150 degrees to 180 degrees. Thus, the joint angles between the respective liquid crystal display panels jointed should be controlled to be greater than 150 degrees or slightly less than 150 degrees, so that contents displayed on one liquid crystal display panel can be seen from the location where a light exiting side of another adjacent liquid crystal display panel lies.

It should be noted that although the joint angles of the respective liquid crystal display panels are arranged in such manner that the joint angles between them are alternatively arranged to be obtuse angles and reflex angles (greater than 180 degrees and less than 360 degrees), as shown in FIG. 3, the present invention is not limited to this. In specific embodiments, in the display system according to the embodiments of the present invention, the joint angles between the respective liquid crystal display panels jointed with each other at the light exiting side in each jointed screen may be same with each other or may be different from each other. The resulting arrangement of the jointed screen may be in various shapes as a whole. Next, the specific structure of the jointed screen will be described by way of several exemplary examples.

EXAMPLE 1

Figure 4:
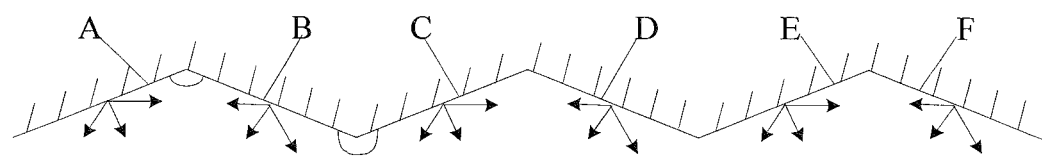
FIG. 4 is a schematic structure view of a first example of the display system according to the present invention.

In a jointed screen of the display system according to Example 1, as shown in FIG. 4, the plurality of liquid crystal display panels jointed with each other are arranged in such manner that the joint angles between them at the light exiting side may be alternatively arranged to be obtuse angles (greater than 90 degrees and less than 180 degrees) and reflex angles (greater than 180 degrees and less than 360 degrees), so as to form the jointed screen in the shape of polygonal line. FIG. 4 shows a jointed screen composed of six liquid crystal display panels A, B, C, D, E, F (the present invention is not limited to this, and at least two or more liquid crystal display panels may be used), and the light exiting sides of the respective liquid crystal display panels (the side on which contents are displayed) lie at the same side of the jointed screen. In FIG. 4, for example, the sides indicated by the arrows are the light exiting sides of the respective liquid crystal display panel. Thus, the joint angle between the liquid crystal display panel A and the liquid crystal display panel B at the light exiting side is an obtuse angle, and the joint angle between the liquid crystal display panel B and the liquid crystal display panel C at the light exiting side is a reflex angle.

Specifically, the respective liquid crystal display panels in the jointed screen arranged in the form of polygonal line according to Example 1 may be applied at narrower passageways. In the case of narrower passageways, if conventional liquid crystal display panels, i.e., the liquid crystal display panels provided with upper polarizers at the light exiting sides are used to decorate the narrower passageways, since the distance between the passageway and the wall is too short, it is very difficult to see information displayed on the screen at a comfortable visible angle. In a case where the jointed screen according to Example 1 is used to decorate the passageway, the contents displayed on the liquid crystal display panel B can be seen from a location at which the liquid crystal display panel A lies, and the contents displayed on the liquid crystal display panel A can be seen from a location at which the liquid crystal display panel B lies. Similarly, the contents displayed on the liquid crystal display panel D can be seen from a location at which the liquid crystal display panel C lies, and the contents displayed on the liquid crystal display panel C can be seen from a location at which the liquid crystal display panel D lies, and so on. It can be understood that when contents displayed on a liquid crystal display panel are seen from a location where another adjacent liquid crystal display panel lies, the viewing distance can be increased, thereby improving comfort of the viewer.

Further, in a case where the jointed screen in the form of polygonal line according to Example 1 is provided to decorate the narrow passageway, the jointed screen may be arranged only at one side of the passageway, or the jointed screens may be arranged at both sides of the passageway. Moreover, in order to ensure that the viewer can see images, when two jointed screens are provided, as shown in FIGS. 5a and 5b, the light exiting sides (indicated by the arrows) of the respective liquid crystal display panels in the two jointed screens should both be arranged to face the space between the two jointed screens, that is, the sides of the two jointed screens on which images are displayed should be arranged to face a passageway between the two jointed screens.

Figure 5A:
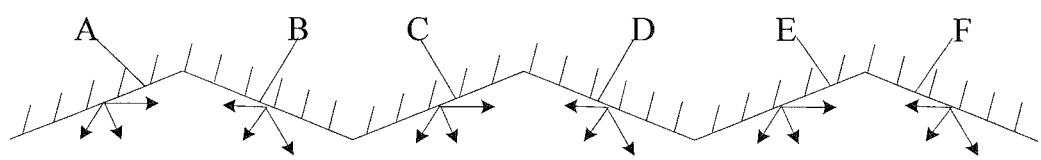
FIGS. 5a and 5b are schematic structure views of two modifications of the first example of the display system according to the present invention.
Figure 5A:
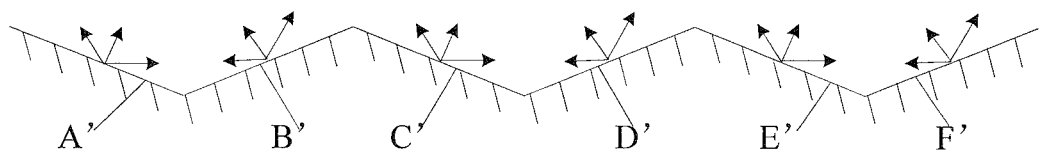
Figure 5B:
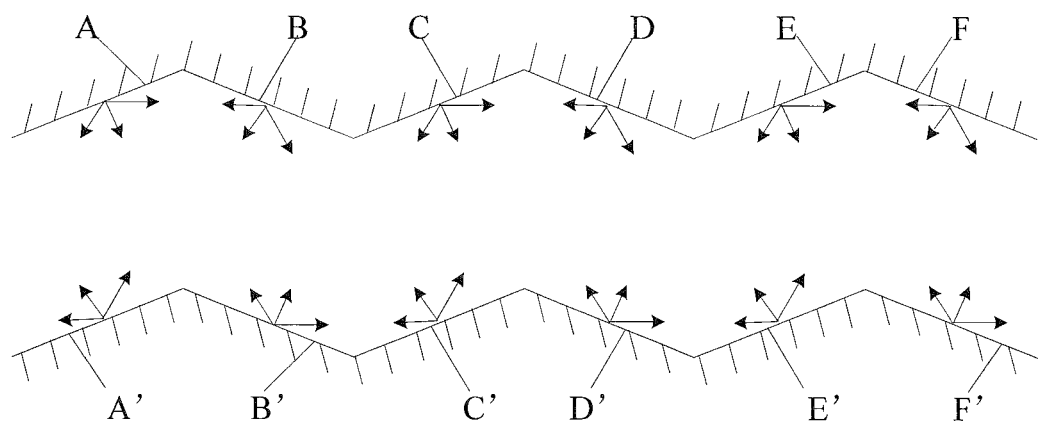

Further, in a case where two jointed screens in the form of polygonal line according to Example 1 are provided at both sides of a narrow passageway, the two jointed screens may be arranged in mirror symmetry, that is, the two jointed screens are symmetrically arranged with respect to the central axis of the passageway (which is used as the symmetry axis), as shown in FIG. 5a, or the two jointed screens may be arranged in such manner that a spacing between the two jointed screens is uniform, as shown in FIG. 5b. In a specific embodiment, when two jointed screens are arranged in mirror symmetry, the viewer located at the liquid crystal display panel B can see contents displayed on the liquid crystal display panel A provided at the same side as that of the liquid crystal display panel B and displayed on the liquid crystal display panel C' provided at the opposite side to that of the liquid crystal display panel B, and may see contents displayed on the liquid crystal display panels D', E' and F' provided at the opposite side to the liquid crystal display panel B, and so on. In a specific embodiment, when two jointed screens are arranged in such manner that a spacing between the two jointed screens is uniform, the viewer located at the liquid crystal display panel B can see contents displayed on the liquid crystal display panel A provided at the same side as that of the liquid crystal display panel B and contents displayed on the liquid crystal display panel A' provided at the opposite side to that of the liquid crystal display panel B, and may see contents displayed on the liquid crystal display panels D', E' and F' provided at the opposite side to that of the liquid crystal display panel B, and so on. It should be noted that the arrangement of the jointed screens at the both sides of the narrow passageway and joint angles of the respective liquid crystal display panels may be selected according to actual requirement, and are not intended to be limited in the embodiments of the present invention.

EXAMPLE 2

Figure 6A:
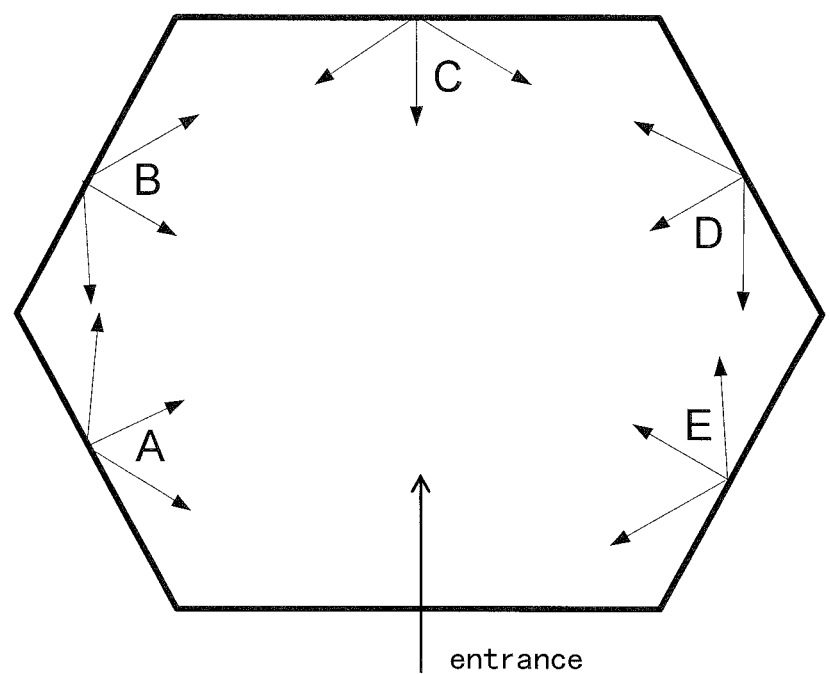
FIGS. 6a and 6b are schematic structure views of a second example of the display system according to the present invention.
Figure 6B:
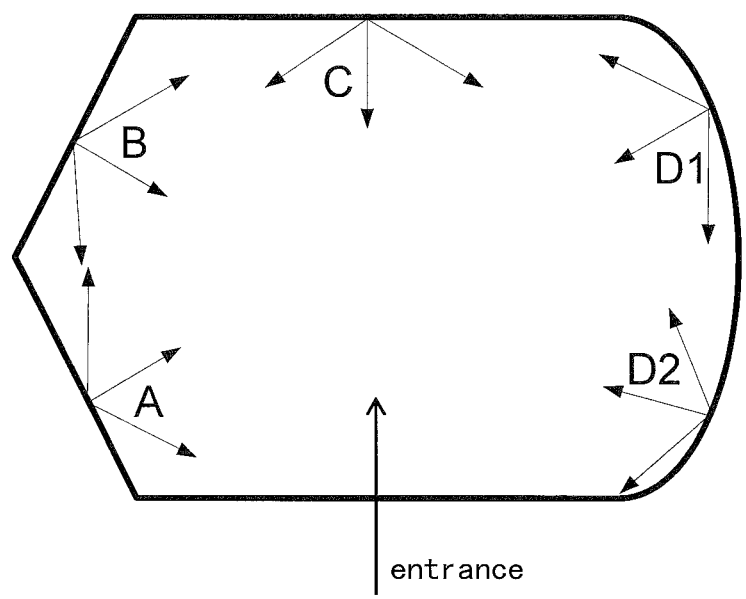

In the display system according to Example 2, as shown in FIGS. 6a and 6b, the plurality of liquid crystal display panels jointed with each other are arranged in such manner that the joint angles between them at the light exiting side all are obtuse angles (greater than 90 degrees and less than 180 degrees), so as to form the jointed screen in a ring structure. The light exiting sides of the respective liquid crystal display panels face the region defined by the ring structure. It can be understood that in order to enable the jointed screen to form the ring structure, the joint angles between the respective liquid crystal display panels in the jointed screen all should be obtuse angles.

Specifically, the respective liquid crystal display panels in the jointed screen arranged in a ring structure according to Example 2 may be applied for ring-shaped exhibiting regions. In specific embodiments, flexible screens or hard screens may be selected for the liquid crystal display panels in the jointed screen according to actual requirements.

As shown in FIG. 6a, five liquid crystal display panels A, B, C, D, E made of hard screens constitute a jointed screen (the present invention is not limited to this, and at least two or more liquid crystal display panels may also be used). This jointed screen together with an entrance region form a hexagon structure (a specific embodiment of a ring structure). The light exiting sides (i.e., the side on which contents are displayed) of the respective liquid crystal display panels should be located at the same side of the jointed screen and face the region defined by the hexagon structure, as indicated by the arrows in FIG. 6a. In this way, contents displayed on the liquid crystal display panels A and E can be seen simultaneously from a location where the entrance lies; contents displayed on the liquid crystal display panel B can be seen from a location where the liquid crystal display panel A lies; and contents displayed on the liquid crystal display panels A and C can be seen from a location where the liquid crystal display panel B, and so on. It can be understood that the greater the number of the liquid crystal display panels provided in the jointed screen is, the greater the joint angles are, and the more easily a viewer located at a liquid crystal display panel can see contents displayed on an adjacent liquid crystal display panel.

In the jointed screen shown in FIG. 6a, all liquid crystal display panels are made of hard screens and hence a transition section between two adjacent liquid crystal display panels is an angled section. In a case where some of the liquid crystal display panels in the jointed screen are made of flexible screens, a transition section between a flexible screen and a hard screen will be an arc section. As shown in FIG. 6b, the liquid crystal display panel D is made of a flexible screen and can be divided into two display regions D1 and D2. Contents displayed on the liquid crystal display panel C and the display regions D2 can be seen from the display region D1, and so on. It can be understood that in a case where the jointed screen is partially made of flexible screen, transition for display contents on the jointed screen is better compared with the jointed screen totally made of hard screens. Therefore, flexible screens or hard screens may be selected for the respective liquid crystal display panels in the jointed screen according to actual requirements.

It should be noted that the above described embodiments are preferred embodiments of the present invention only and are not intended to limit the present invention. It would be appreciated by those skilled in the art that various changes and substitutions may be made without departing from the principle and spirit of the disclosure. Such changes and substitutions fall within the scope of the disclosure.

What is claimed is:

1. A display system, comprising at least one jointed screen which is composed of a plurality of liquid crystal display panels jointed with each other, in which:
   each liquid crystal display panel is provided with a first polarizer only at a light entering side thereof, so that a visible angle at which contents displayed by the liquid crystal display panel can be seen from a light exiting side of the liquid crystal display panel is an obtuse angle;
   two adjacent jointed liquid crystal display panels are jointed with each other at their adjacent sides, and a joint angle formed at the light exiting side is greater than a right angle, such that the light exiting side of each liquid crystal display panel is located in a region covered by an angle range of the visible angle of at least one liquid crystal display panels other than said liquid crystal display panel.

2. The display system according to claim 1, wherein the angle range of the visible angle at which contents displayed by the liquid crystal display panel can be seen from the light exiting side of the liquid crystal display panel increases as the size of the liquid crystal display panel is increased.

3. The display system according to claim 1, wherein the visible angle at which contents displayed by the liquid crystal display panel can be seen from the light exiting side of the liquid crystal display panel is in an angle range of 120 degrees to 180 degrees.

4. The display system according to claim 3, wherein the visible angle at which contents displayed by the liquid crystal display panel can be seen from the light exiting side of the liquid crystal display panel is in an angle range of 150 degrees to 180 degrees.

5. The display system according to claim 1, wherein in the at least one jointed screen, the plurality of liquid crystal display panels jointed with each other are arranged in such manner that the joint angles between them at the light exiting side are alternatively arranged as obtuse angles and reflex angles, so as to form the jointed screen in the shape of a polygonal line.

6. The display system according to claim 5, wherein the at least one jointed screen comprises two jointed screens, and the light exiting sides of respective liquid crystal display panels in the two jointed screens all face a space between the two jointed screens.

7. The display system according to claim 6, wherein the two jointed screens are arranged in mirror symmetry, or the two jointed screens are arranged in such manner that a spacing between them is uniform.

8. The display system according to claim 7, wherein the angle range of the visible angle at which contents displayed by the liquid crystal display panel can be seen from the light exiting side of the liquid crystal display panel increases as the size of the liquid crystal display panel is increased.

9. The display system according to claim 7, wherein the visible angle at which contents displayed by the liquid crystal display panel can be seen from the light exiting side of the liquid crystal display panel is in an angle range of 120 degrees to 180 degrees.

10. The display system according to claim 9, wherein the visible angle at which contents displayed by the liquid crystal display panel can be seen from the light exiting side of the liquid crystal display panel is in an angle range of 150 degrees to 180 degrees.

11. The display system according to claim 1, wherein the joint angles of the plurality of liquid crystal display panels jointed with each other all are obtuse angles, so that the jointed screen forms a ring structure, and the light exiting sides of the respective liquid crystal display panels face a region defined by the ring structure.

12. The display system according to claim 11, wherein the liquid crystal display panel is made of a flexible screen or a hard screen.

13. The display system according to claim 11, wherein the angle range of the visible angle at which contents displayed by the liquid crystal display panel can be seen from the light exiting side of the liquid crystal display panel increases as the size of the liquid crystal display panel is increased.

14. The display system according to claim 11, wherein the visible angle at which contents displayed by the liquid crystal display panel can be seen from the light exiting side of the liquid crystal display panel is in an angle range of 120 degrees to 180 degrees.

15. The display system according to claim 14, wherein the visible angle at which contents displayed by the liquid crystal display panel can be seen from the light exiting side of the liquid crystal display panel is in an angle range of 150 degrees to 180 degrees.

* * * * *